United States Patent
Panz et al.

(10) Patent No.: US 6,846,865 B2
(45) Date of Patent: Jan. 25, 2005

(54) SILICONE RUBBER FORMULATIONS WITH HYDROPHOBIC SILICAS

(75) Inventors: Christian Panz, Wesseling (DE); Ralf Schmoll, Bonn (DE); Uwe Schachtely, Princeton, NY (US); Michael Kempf, Rodenbach (DE); Mario Scholz, Gründau (DE)

(73) Assignee: Degussa AG, Duesseldorf (DE)

( * ) Notice: Subject to any disclaimer, the term of this patent is extended or adjusted under 35 U.S.C. 154(b) by 2 days.

(21) Appl. No.: 10/247,569

(22) Filed: Sep. 20, 2002

(65) Prior Publication Data

US 2003/0181565 A1 Sep. 25, 2003

(30) Foreign Application Priority Data

Sep. 20, 2001 (DE) .......................................... 101 46 256
Jan. 5, 2002 (DE) .......................................... 102 00 247

(51) Int. Cl.$^7$ ............................. C08L 83/00; C08K 3/36
(52) U.S. Cl. ...................... 524/268; 524/266; 524/492; 524/588; 528/15; 528/17; 528/18; 525/477
(58) Field of Search .................................. 524/266, 268, 524/492, 588; 525/477; 528/15, 17, 18; 428/405

(56) References Cited

U.S. PATENT DOCUMENTS

| 4,072,796 | A | * | 2/1978 | Reinhardt et al. | .......... 428/405 |
| 5,009,874 | A | | 4/1991 | Parmentier et al. | |
| 6,020,395 | A | * | 2/2000 | Angeletakis | ................ 523/116 |
| 6,191,122 | B1 | * | 2/2001 | Lux et al. | .................... 514/122 |
| 6,239,243 | B1 | * | 5/2001 | Deng et al. | .................... 528/12 |
| 2003/0144404 | A1 | * | 7/2003 | Schachtely et al. | ......... 524/492 |
| 2003/0195290 | A1 | * | 10/2003 | Scholz et al. | ............... 524/493 |

FOREIGN PATENT DOCUMENTS

| DE | 26 28 975 | 12/1977 |
| DE | 27 29 244 | 1/1979 |

* cited by examiner

*Primary Examiner*—Margaret G. Moore
*Assistant Examiner*—Marc S. Zimmer
(74) *Attorney, Agent, or Firm*—Oblon, Spivak, McClelland, Maier & Neustadt, P.C.

(57) ABSTRACT

The invention relates to silicone rubber formulations comprising organopolysiloxanes and hydrophobicized silicas, which possess an extremely high level of whiteness.

17 Claims, 3 Drawing Sheets

SILICONE RUBBER FORMULATIONS WITH HYDROPHOBIC SILICAS

BACKGROUND OF THE INVENTION

1. Field of the Invention

The invention relates to silicone rubber formulations with hydrophobic silicas, featuring extremely low water absorption, a high level of whiteness, and low-thickening properties with a high reinforcing effect in the silicone rubber vulcanizates.

2. Description of the Background

The use of silicas, especially hydrophobicized precipitated silicas, in silicone rubber formulations is known and is described in, for example, DE 27 29 244 and DE 26 28 975.

DE 26 28 975 and DE 27 29 244 describe preparing hydrophobic silicas by reacting a hydrophilic precipitated silica featuring low water absorbency with silicone oil or dimethyldichlorosilane, respectively. In the process according to DE 26 28 975, the reaction is carried out with the hydrophobicizer (silicone oil) being added to the dry precipitated silica; in the process according to DE 27 29 244, the hydrophobicizer (dimethyldichlorosilane) is introduced directly into the precipitated silica suspension. In both cases, the hydrophobicizing step is followed by heat treatment at elevated temperatures, specifically between 200 and 400° C.

A disadvantage of this process is that the precipitated silica thus hydrophobicized becomes discolored at the required process temperatures. The discoloration of the silica is particularly inconvenient when it is added to silicone formulations; that is, when these hydrophobic precipitated silicas are added to silicone rubber formulations or to defoamer mixtures based on silicone oil.

As a measure of the discoloration it is possible to use the value known as reflectance. In measuring the reflectance, the diffuse reflection power of a sample is investigated. The higher the diffuse reflection power of a sample, the higher its reflectance and thus the higher the whiteness of the sample.

Precipitated silicas generally have a reflectance of not more than 97%. One object of the present invention is therefore to prepare a silicone rubber formulation comprising hydrophobic silicas which has a high reflectance.

Discoloration occurs in particular with the hydrophobicizing of silicas when the silicas are strongly hydrophobicized: that is, have a high methanol wettability and high carbon loadings. It is precisely these properties, however, which are frequently desired (e.g. in silicone rubber formulations).

In order to fully develop their mechanical properties, silicone rubber formulations need active reinforcing fillers. Commonly, highly disperse silicas are used. Because of the ease of mechanical processing of LSR (liquid silicone rubber) formulations—especially in injection molding—HTV (high-temperature vulcanizing) silicone rubber formulations are increasingly being replaced by LSR mixtures.

Here, the reinforcing filler must produce good mechanical properties in the vulcanizate, without adversely affecting the rheological properties of the silicone rubber formulations. After compounding, the silicone rubber formulations must be fluid, with no afterstiffening (grapehardening) even after prolonged storage periods.

HTV and LSR silicone rubber formulations are processed at temperatures well above 100° C. Here, fillers containing water may result in the disruptive formation of steam bubbles in the silicone formulation. In the case of air-curing silicone rubber formulations, too high a water content in the filler results in unwanted curing in the course of storage. Accordingly, the water absorption characteristics, i.e., the amount of water adsorbed at different relative atmospheric humidities, constitute a measure of the processability of the filler.

A disadvantage of the known silica hydrophobicizing processes is that only a limited amount of hydrophobicizer can be attached covalently to the silica. Particularly in silicone rubber formulations, however, high carbon loadings are desired, since they permit decisive improvements in the processing properties and in the rheological properties, such as the thickening, i.e., low yield point and low viscosity, of the compounds.

As a measure of the thickening, it is possible to utilize the DBP number. The DBP number indicates the absorption capacity of a silica for DBP. The measurement technique shows the amount of dibutyl phthalate, in g, on a sample of 100 g, at which a sharp increase in force in the compounder is observed.

The thickening action of the known hydrophobic precipitated silicas is probably attributable to their low carbon contents of less than 3.1% and/or to inhomogeneous hydrophobicizing. This lowers the possible fraction of filler in silicone rubber formulations. DE 26 28 975 lists data on the testing of hydrophobic precipitated silicas in silicone rubber formulations, in which the hydrophobic precipitated silica is used in increasing weight fractions. It is evident there that, even at a level of 15% of the hydrophobic silica in the rubber, the self-leveling properties of the silica disappear, and that, at 20%, fluid compounds are no longer obtained. In all the tables it can clearly be seen that all of the mechanical properties improve as the filler content goes up. It would therefore be desirable to prepare silicone rubber formulations which include high fractions of hydrophobic silicas, for improving the mechanical properties, but which at the same time are still fluid.

SUMMARY OF THE INVENTION

It was therefore an object of the present invention to provide a silicone rubber formulation which overcomes the difficulties described above.

It was another object of the invention to provide a silicone rubber formulation which features a high fraction of fillers such as hydrophobic silicas, and a high level of whiteness.

It has been found that this can be achieved by using a hydrophobic silica which was prepared by engaging a polysiloxane with a hydrophilic silica and then conditioning the mixture and conducting oxidative heat treatment.

The present invention accordingly provides silicone rubber formulations containing 0.5–60% by weight of hydrophobic silicas having the following properties:

| | |
|---|---|
| carbon content | >3.1% |
| methanol wettability | >60% |
| reflectance | >94% |
| BET/CTAB ratio | >1 and <3 |
| DBP absorption | <230 g/100 g |
| BET surface area | 50–110 m$^2$/g |
| CTAB surface area | >30 m$^2$/g |
| water vapor absorption at 30° C. and 30 AH* | <1.3 |

-continued

| | |
|---|---|
| water vapor absorption at 30° C. and 70 AH* | <1.7 |

*AH = ambient humidity
and
from 30–99.5% by weight of an organopolysiloxane of the formula
$Z_nSiR_{3-n}$—O—$[SiR_2O]_x$—$SiR_{3-n}$—$Z_n$ where

- R=alkyl, alkoxy, aryl, hydroxy, hydride, alkenyl radicals, having 1 to 50 carbon atoms, unsubstituted or substituted by O, S, F, Cl, Br, I, in each case identical or different, and/or polystyrene, polyvinyl acetate, polyacrylate, polymethacrylate, and polyacrylonitrile radicals having 50–10,000 repeating units.
- Z=H, OH, Cl, Br, amino, amineoxy, alkenyloxy, aryloxy or phosphate radicals, it being possible for the organic radicals to carry up to 20 carbon atoms, in each case identical or different.
- n=1–3
- x=100–15,000, preferably 100–11,000, with particular preference 100–8,000.

The present invention also provides methods of making the formulation described above by combining the indicated components.

The present invention additionally provides

A more complete appreciation of the invention and many of the attendant advantages thereof will be readily obtained as the same becomes better understood by reference to the following Figures in conjunction with the detailed description below.

DETAILED DESCRIPTION OF THE INVENTION

Figure 1:
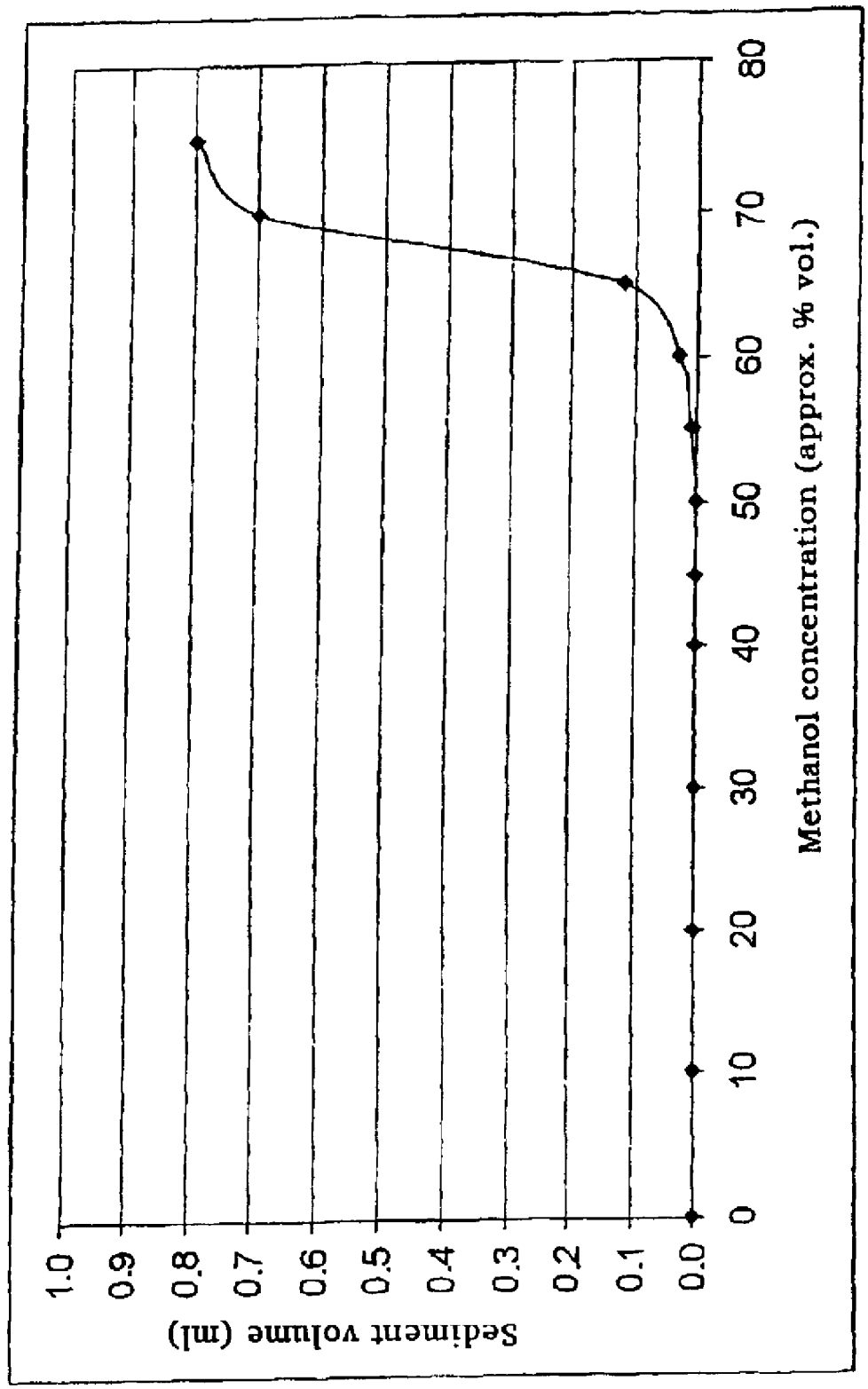
FIG. 1: methanol wettability of a silica used in a preferred embodiment of the invention described herein.

The silicas used may be pyrogenic silicas or precipitated silicas. What is important is that the silicas used have the following physicochemical data:

| | |
|---|---|
| carbon content | ≥3.1%, preferably ≥5.0%, with particular preference 3.1–10%, or from 4 to 7% |
| methanol wettability | ≥60%, preferably more than 65%, with particular preference more than 70 or 75% |
| reflectance | ≥94%, preferably >95, with particular preference more than 96 |
| BET/CTAB ratio | >1 and <3 |
| DBP absorption | 50–230 g/100 g |
| BET surface area | 50–110 m²/g |
| CTAB surface area | 30 to 110 m²/g |

The ranges of preference specified may be adjusted independently of one another.

The hydrophobic silicas used may additionally, each independently of one another, be characterized by the following properties:

| | |
|---|---|
| modified Sears number | <1.6 |
| pH | 5.0–9.0, preferably 7.0–8.5 |
| water content | <2%, preferably <1.5% |
| conductivity | <500 µS, preferably 150 µS |
| loss on ignition | >3% |

The conductivity may be below 100, 60, 30, or even below 20 µS.

Preference is given to using precipitated silica as the silica. The hydrophobicization can be carried out by the following steps:

a) preparing a mixture of an organopolysiloxane derivative and a precipitated silica, b) conditioning the mixture at from 10 to 150° C. for a period of from 0.5 to 72 h, and c) conducting oxidative heat treatment at more than 300° C. with an oxidizing gas.

The thorough distribution of the hydrophobicizer and the high degree of hydrophobicization of a hydrophobic precipitated silica thus prepared result in silicone rubber formulations in very low thickening, unimpaired even by prolonged storage, in conjunction with good mechanical and optical properties in the vulcanizates.

The hydrophobic silica is preferably prepared with an organopolysiloxane derivative, so that after heat treatment its only organic radicals are methyl groups, this going hand in hand with a very high thermal load-bearing capacity (temperatures of more than 300° C. with ingress of air do not lead to discolorations).

These hydrophobic silicas are prepared using preferably silicas with a low silanol group density. The measure used for the amount of silanol groups is the modified Sears number, i.e., the alkali consumption of an acid-base titration. One measure of the silanol group density is the modified Sears number, defined further below, in conjunction with the BET surface area.

The reaction conditions employed for preparing the silica used do not lead to carbonization and thus lead to virtually no discoloration. For this reason it is important that the hydrophilic base silica contains no organic impurities, since otherwise the discoloration increases. Since the cleavage products which form as a result of the heat treatment, and which are gaseous under the process conditions, may bring about a certain degree of discoloration even in an oxidizing atmosphere, it is important to remove these cleavage products from the product by means of a sufficient throughput of gas.

The use of liquid polysiloxane, preferably polydimethylsiloxane of preferably 30–100 mPas, permits optimum distribution on the base silica. Under the oxidative reaction conditions, the polydimethylsiloxanes used are able to undergo resinification. This has the great advantage that the hydrophobicizer can be distributed on the silica in liquid form and then fixed. The amount of bound carbon can be greatly increased by the oxidative heat treatment.

Figure 2:
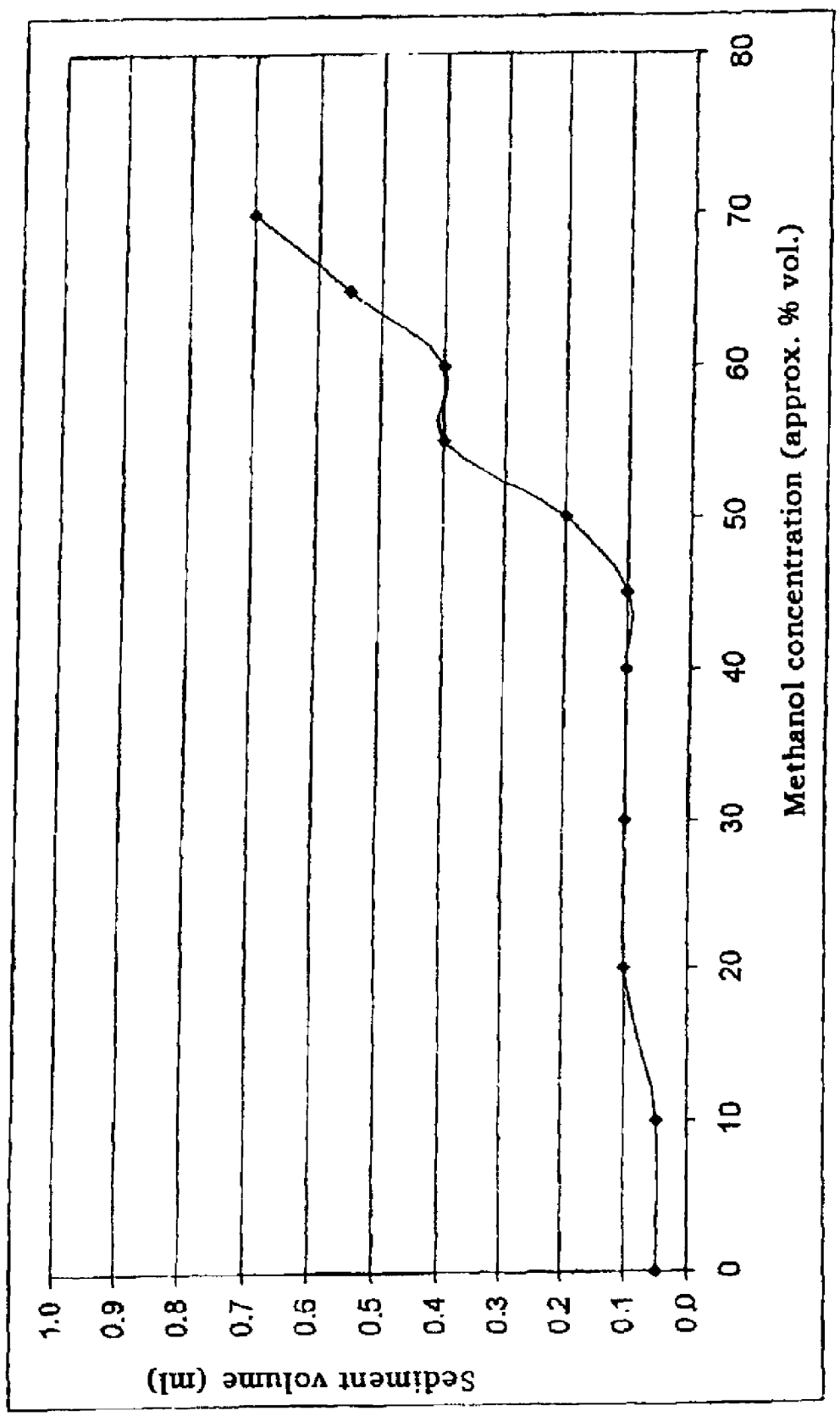
FIG. 2: methanol wettability of customary hydrophobic silicas.

The silicas used with preference exhibit a steep methanol wettability curve; in other words, homogeneous hydrophobicization has taken place (FIG. 1). FIG. 2 shows the methanol wettability of customary hydrophobic silicas.

High carbon loadings and high methanol wettabilities bring about decisive improvements in the properties of silicas in the novel silicone rubber formulations. The further reduction in moisture absorbency permits no pressurized vulcanizations at temperatures above 100° C. in silicone rubber formulations, since no disruptive steam bubbles occur in the vulcanizate. The hydrophobic silicas containing high levels of carbon exhibit substantially improved rheological properties in the silicone rubber formulations of the invention, i.e., they have only a low thickening action. This low thickening action makes it possible to prepare fluid silicone rubber formulations with filling levels of well over 20% of hydrophobic precipitated silica, which can despite this be processed by injection molding. Moreover, the higher filling level leads to markedly improved mechanical properties in the vulcanizates.

The hydrophobic precipitated silicas may be prepared in three steps:

First, a liquid polysiloxane derivative is initially distributed, physically, on the silica surface. Where this initial distribution is carried out in aqueous media, i.e., suspensions or silica with a water content of more than 70%, the silica is typically unstable. It must therefore be isolated quickly by filtration following the initial distribution, and/or subjected to accelerated drying (in a spin-flash drier or nozzle tower drier, for example). This conserves the distribution of the organopolysiloxane droplets on the silica and prevents separation into water, silicone oil, and silica.

Subsequently, in a controlled conditioning step—process step b)—the distribution of the hydrophobicizer is improved further and engagement of the polysiloxane derivative with the silica surface is achieved. This state of distribution is stable even in aqueous media. Following process step b), there is no longer any separation between the polysiloxane derivative and the silica. At carbon contents $\geq 3.1$, the conditioned silicas can be adjusted steplessly to a methanol wettability of up to 55%. The BET/CTAB ratio after this step is <1. The binding of the polysiloxane to the silica is thought to be a result of the formation of multiple hydrogen bonds between the siloxane bridges of the polysiloxane molecules and the silanol groups on the silica surface.

This is followed by a heat treatment in an oxidizing atmosphere, which suppresses discoloration phenomena, ensures covalent binding of the hydrophobicizing agent, and—probably as a result of the formation of gaseous cleavage products—increases further the distribution of the hydrophobicizer. Heat treated silicas, with a lower carbon content than the corresponding conditioned silica, have a higher methanol wettability. Heat treatment in an oxidizing atmosphere assists the resinification of the polysiloxanes, so that much larger amounts of hydrophobicizer can be anchored covalently on the silica. The BET/CTAB ratio has turned around and is now >1.

As the organopolysiloxane derivative it is possible to use all organosilanes or organohalosilanes which are commonly used to hydrophobicize precipitated silicas.

Step a) of the process of the invention can be conducted with the following variants:

Addition of organopolysiloxane derivative to a precipitated silica having a water content of from 1 to 80% by weight, preferably from 20 to 60% by weight.

Addition of the organopolysiloxane derivative to a dispersion of the precipitated silica, i.e., following precipitation of silicate with an acid, for example, using a Rhein-Hütte mixer or Kotthoff-Mischsirene or Ultra-Turrax. This necessitates rapid filtration and/or accelerated drying after the reaction.

Addition of the organopolysiloxane derivative to a precipitated silica having a water content of from 70 to 99% by weight, with subsequent isolation of the solid from the water. Isolation can be effected by filtration, nozzle tower, spin-flash, or other accelerated drying. The higher the water content, the more quickly isolation should be carried out. Separation should be avoided.

Simultaneous supplying of the precipitated silica or hydrous silica (in the form, for example, of filtercake, dispersion or suspension) and the organopolysiloxane derivative to a spin-flash drier.

Mixing of dry precipitated silica with polysiloxane, in a Gericke mixer, for example.

An alternative possibility is first to prepare a masterbatch, i.e., a conditioned precipitated silica, obtained according to process steps a) and b), and to mix it with a (hydrophilic) hydrous precipitated silica (e.g., filtercakes, silica suspensions or silica dispersions).

The water content of the hydrophilic precipitated silica may vary within the ranges mentioned above.

The base silica may be coated in a mass ratio, for example, of from 1:1 to 1:3 with silicone oil, e.g., DOW CORNING (R) 200 FLUID 50 CS (50 mPas dimethylpolysiloxane terminated with trimethylsilyl groups, carbon content of approximately 33%) (step a)). The resulting powder is conditioned at a temperature of more than 100° C. for half an hour, for example. The conditioning (step b) here is carried out until the resulting material is wettable by water (methanol wettability <20; regarding the definition of methanol wettability see the measurement technique section) but which when introduced into water no longer exhibits any separation between silica and silicone oil (if step c) follows directly on from step b), a methanol wettability >20 is preferred). Mixing of this masterbatch, (e.g., 50% by weight silica and 50% by weight silicone oil) with aqueous silica dispersions or silica suspensions produces stable mixtures in which the silicone oil no longer separates from the silica. The total mixture typically contains one part by weight of silicone oil, about 4–8 parts by weight of silica, and 20–60 parts by weight of water. In order to prepare such a suspension, for example, the masterbatch (e.g., 50% silica and 50% silicone oil) can be mixed thoroughly with about 10–16 times the amount of filtercake (solids content approximately 20%) and about 10–20 times the amount of additional water. The advantage of this procedure is that the water-wettable masterbatch (which contains up to 75% of hydrophobic organopolysiloxane!) can be dispersed directly in silica precipitation suspensions or silica feeds, very finely and stably, without the need to use emulsifiers or surfactants. After such a mixture has been dried, or filtered and then dried, the organopolysiloxane-containing silica thus obtained can be conditioned again (step b).

These steps can be carried out individually, where appropriate with grinding beforehand. Grinding should not, however, be carried out before coating a). It is also possible to carry out two or more of these variants—that is, identical or different variants—in succession. The following embodiments of the process of the invention are conceivable:

One of steps a), b), and c) is performed a number of times (from 2 to 5 times) in succession.

Steps a) and b) are carried out a number of times (from 2 to 5 times) in succession.

All steps a), b), and c) are carried out a number of times (from 2 to 5 times) in succession; in other words, the process is run through a number of times.

Process step b) is preferably carried out by heat treatment at 100–150° C. over the course of from 0.5 to 2 hours. After conditioning, the partly hydrophobicized silica present may have a methanol wettability of 20% or more. Fundamentally, a distinction may be made between wet and dry hydrophobicization.

Wet hydrophobicization means that the silicate starting materials are aqueous silica suspensions, silica feeds, or high water content silica filtercakes, which are coated with the corresponding hydrophobicizers, as is described, for example, in DE 27 29 244, incorporated herein by reference, for precipitation suspensions with organohalosilanes.

Dry hydrophobicization means that the silicate starting materials are silica powders with different moisture contents of from 1 to 75%, which are coated with the corresponding hydrophobicizers. This process is described, for example, in DE 26 28 975, incorporated herein by reference.

The silica of the invention is prepared using organopolysiloxane derivatives; it is, however, also possible to use other silicon compounds which react to give organopolysiloxanes under the chosen reaction conditions (for example, dichlorodimethylsilane in an aqueous environment).

Hydrophobicizing reagents used comprise organopolysiloxane derivatives or their precursors, for example, those with the composition $R_{4-n}SiX_n$ (where n=1, 2, 3), $[SiR_xX_yO]_z$ (where $0 \leq x \leq 2$, $0 \leq y \leq 2$, $3 \leq z \leq 10$, with x+y=2), $[SiR_xX_yN]_z$ (where $0 \leq x \leq 2$, $0 \leq y \leq 2$, $3 \leq z \leq 10$ with x+y=2), $SiR_nX_mOSiR_oX_p$ (where $0 \leq n \leq 3$, $0 \leq m \leq 3$, $0 \leq o \leq 3$, $0 \leq p \leq 3$, with n+m=3, o+p=3), $SiR_nX_mNSiR_oX_p$ (where $0 \leq n \leq 3, 0 \leq m \leq 3$, $0 \leq o \leq 3$, $0 \leq p \leq 3$, with n+m=3, o+p=3), $SiR_nX_m[SiR_xX_yO]_zSiR_oX_p$ (where $0 \leq n \leq 3$, $0 \leq m \leq 3$, $0 \leq x \leq 2$, $0 \leq y \leq 2$, $0 \leq o \leq 3$, $0 \leq p \leq 3$, $1 \leq z \leq 10,000$ with n+m=3, x+y=2, o+p=3). These compounds may be linear, cyclic, and branched silane, silazane and siloxane compounds. R may comprise alkyl and/or aryl radicals, which may be substituted by functional groups such as the hydroxyl group, the amino group, polyethers such as ethylene oxide and/or propylene oxide, and halide groups such as fluoride, chloride, bromide or iodide. R may also contain groups such as hydroxyl, amino, halide, alkoxy, alkenyl, alkynyl, and aryl groups, and groups containing sulfur. X may comprise reactive groups such as silanol, amino, mercapto, halide, alkoxy, alkenyl, and hydride groups.

Preference is given to using linear polysiloxanes having the composition $SiR_nX_m[SiR_xX_yO]_zSiR_oX_p$ (where $0 \leq n \leq 3$, $0 \leq m \leq 3$, $0 \leq x \leq 2$, $0 \leq y \leq 2$, $0 \leq o \leq 3$, $0 \leq p \leq 3$, $1 \leq z \leq 10,000$ with n+m=3, x+y=2, o+p=3) in which R is preferably represented by methyl.

Particular preference is given to using polysiloxanes having the composition $SiR_nX_m[SiR_xX_yO]_zSiR_oX_p$ (where $0 \leq n \leq 3$, $0 \leq m \leq 1$, $0 \leq x \leq 2$, $0 \leq y \leq 2.0$, $0 \leq o \leq 3$, $0 \leq p \leq 1$, $1 \leq z \leq 1,000$ with n+m=3, x+y=2, o+p=3) in which R is preferably represented by methyl.

Owing to the selected process of the invention, however, it is also especially possible to use polysiloxanes of low volatility which contain no functional groups.

Because of the presence of certain functional groups in polysiloxane, salts or low molecular mass substances such as $NH_3$, amines, alcohols, etc. may be formed, which can lead to disruptive impurities. An important exception here is constituted by silanol-functionalized polysiloxanes, since the only impurity formed here is water, which is easy to remove under the chosen process conditions.

With preference, the hydrophobicizer may comprise a methyl-terminated polydimethylsiloxane, in particular one having a viscosity of 30–100 mPas, preferably 40–60 mPas. An example of a suitable polysiloxane oil is DOW CORNING (R) 200 FLUID 50 CS.

Since the aforementioned hydrophobicizers are compounds of low volatility, an important part in the initial distribution of the hydrophobicizers on the silica surface is played by capillary forces and diffusion events at the liquid/solid phase boundary.

Even if the hydrophobicizers used with preference exhibit a certain volatility in the course of a thermal treatment, the liquid/solid distribution is still important. For this reason, a distinction is made here between physical initial distribution, conditioning, and heat treatment.

The heat treatment, i.e., process step c), is conducted at at least 300° C., preferably above 350° C., with very particular preference above 360–370° C., with an oxidizing gas. This gas can be air, $Cl_2$, $NO_x$ ($NO_2$, $N_2O_5$, NO, $N_2O$), $O_3$, $O_2$, $Br_2$, $F_2$, or a mixture of these gases with further inert gases such as $CO_2$, $N_2$ or burner waste gases, in each case preferably at not less than 1% by volume.

Additionally, the oxidizing gas may optionally contain up to 80%, preferably up to 50%, with particular preference 20–40%, by volume of water.

In every case, a good gas throughput must be ensured; as far as possible, the gas must reach every silica particle. Apparatus suitable for ensuring this includes, for example, metal lattice ovens, fluidizing chambers, and belt reactors. The oxidative heat treatment in process step c) may also be conducted under fluidic conditions. These conditions may be set in a suspended bed, moving bed, fluidized bed and/or turbulent bed.

Following the conditioning step and/or heat treatment, the hydrophobicized silica is optionally ground. Grinding before the coating step a), however, is not appropriate, and leads to low-grade products with inhomogeneous hydrophobicization.

Optional grinding gives a silica having a $d_{4,3}$ of 8–25 μm, preferably 8–15 μm.

For silicone rubber mixtures which are processed at temperatures of almost 200° C. with ingress of air, it is important that there are no organic constituents on the silica which might undergo discoloration at these temperatures under the influence of oxygen. Organosilicon compounds containing exclusively methyl, phenyl, fluorocarbon or hydrofluorocarbons as organic radicals are extremely temperature-stable even in the presence of atmospheric oxygen. In order, however, to achieve effective cleavage of the stable siloxane bridges of siloxane compounds and to bond them covalently to the silica, temperatures above 300° C. are required. At these high temperatures, siloxane compounds, especially in the case of precipitated silicas with a low silanol group density, normally lead to discoloration phenomena on the silica. The process described for preparing the hydrophobic silicas needed in the silicone rubber formulations of the invention makes it possible to suppress this discoloration. These discoloration phenomena are measured by reflectance measurements with an optical measurement technique based on diffuse reflection. Where the reflectances of silica are >94%, the silica-filled silicone rubber compound appears pure white. Since the refractive indices of silica and silicone rubber are close to one another, even very small impurities and discolorations in the silica filler become clearly visible in the silicone rubber. A reflectance of 93% already leads to a marked discoloration in the silicone rubber, visible with the naked eye, despite the fact that the silica powder before incorporation appears pure white to the viewer.

The present invention additionally provides for uses of the silicone rubber formulations of the invention.

This relates to their use in silicone rubber systems of the group embracing high temperature crosslinking (vulcanizing) silicone rubbers (HTV), liquid silicone rubbers (LSR/LIM), and two-component, room temperature crosslinking (vulcanizing) silicone rubbers (RTV-2C).

Furthermore the silicone rubber formulations of the invention may be used in sparkplug leads, other automotive applications, gaskets, sports goods, impression compounds, dental composites, silicone rubber coatings or surface-coating systems.

As organopolysiloxanes it is possible to use any polysiloxanes which have been used to date or could be used as a basis for organopolysiloxane elastomer compositions which can be cured at room temperature (RTV), only slightly elevated temperature (LTV) or high temperature (HTV). They can be described, for example, by the general formula $$Z_nSiR_{3-n}—O—[SiR_2O]_x—SiR_{3-n}—Z_n$$

where Z and R are as described above.

Within and/or along the siloxane chain in the formula indicated above it is also possible for siloxane units other than diorganosiloxane units to be present, said siloxane units normally being present only as impurities, examples being those of the formulae $RSiO_{3/2}$, $R_3SiO_{1/2}$, and $SiO_{4/2}$, where R in each case has the definition indicated above for it. The amount of these other siloxane units should not exceed 10 mole percent.

Examples of R with the definition of alkyl radical are methyl, ethyl, propyl, butyl, hexyl, and octyl radicals; as alkenyl radicals it is possible to use vinyl, allyl, ethylallyl, and butadienyl radicals; and as aryl radicals it is possible to use phenyl and tolyl radical.

Examples of substituted hydrocarbon radicals R are, in particular, halogenated hydrocarbon radicals such as the 3,3,3-trifluoropropyl radical, chlorophenyl radical and bromotolyl radical; and cyanoalkyl radicals, such as the β-cyanoethyl radical.

Examples of polymers as radical R are polystyrene, polyvinyl acetate, polyacrylate, polymethacrylate and polyacrylonitrile radicals attached via carbon to silicon.

Owing to their easier availability, the predominant fraction of the radicals R is preferably composed of methyl groups. The other radicals R are, in particular, vinyl and/or phenyl groups.

Particularly in the case where the formulations present cure at room temperature to elastomers on the ingress of water, while being storable in the absence of water, Z are hydrolyzable groups. Examples of such groups are amino, amineoxy, alkenyloxy (e.g., $H_2C=CCH_3CO—$), acyloxy, and phosphate groups. Particularly owing to the easier availability, acyloxy groups, especially acetoxy groups, are preferred as Z. Examples of hydrolyzable atoms Z are halogen atoms and hydrogen atoms; examples of alkenyl groups Z are, in particular, vinyl groups.

The viscosity of the organopolysiloxanes used in the context of the invention ought not to exceed 500,000 cP at 25° C., preferably 150,000 cP at 25° C. Accordingly, the value x ought preferably not to exceed 40,000. It is also possible to use mixtures of different organopolysiloxanes.

The mixing of these organopolysiloxanes with the hydrophobic silicas and, where appropriate, the further constituents of the formulation of the invention may take place in any desired, known way, for example, in mechanical mixers. It happens very rapidly and easily, irrespective of the sequence in which the constituents of the mixture are added.

The silicas used in accordance with the invention are used preferably in amounts of from 0.5 to 60% by weight, more preferably from 10% to 40% or 40–60% by weight, based on the total weight of the compositions which can be cured to elastomers. It is also possible to use amounts of up to 60% by weight in the case of HTV organopolysiloxane elastomers.

Where the only reactive terminal units present in the diorganopolysiloxanes which contain reactive terminal units are those containing Si-bonded hydroxyl groups, it is necessary to react these diorganopolysiloxanes in a known way with crosslinking agent, where appropriate in the presence of a condensation catalyst, in order to cure them conventionally or in order to convert them into compounds which cure to elastomers through the water which is present in the air, where appropriate with the addition of further water. In the case of HTV diorganopolysiloxane elastomers, it is possible, at correspondingly advantageous temperatures, to use organic peroxides, such as bis-2,4-dichlorobenzoyl peroxide, benzoyl peroxide, tert-butyl perbenzoate or tert-butyl peracetate, for example, at 0.5–5.0% by weight.

As high temperature vulcanizing organosiloxanes it possible to use those wherein the organic substituents conists of methyl, ethyl, phenyl, trifluoromethylphenyl [$F_3CC_6H_4$] or trimethylsilmethylene [$(CH_3)_3SiCH_2—$] radicals, e.g., dimethyl-, diethyl-, phenylmethyl-, phenylethyl-, ethylmethyl-, trimethylsilmethylenemethyl-, trimethylsilmethyleneethyl-, trifluoromethyl-phenylmethyl- or trifluoromethylphenylethylsiloxanes and copolymers of such compounds. Moreover, the polymers may include limited amounts of diphenyl-siloxane, bistrimethylsilmethylenesiloxane, and bistrifluoromethylphenylsiloxane units, and also siloxanes containing units of the formula $RSiO_{1.5}$ and $R_3SiO_{0.5}$, where R represents one of the above radicals.

The formulations of the invention can be crosslinked by adding silanes. The silicone rubber formulations may therefore further contain from 0.01 to 20% by weight, preferably 0.5–5% by weight, of a crosslinker having the general formula $$R'_{4-t}SiZ'_4$$

where
R'=alkyl, alkoxy, aryl, alkenyl radicals, having from 1 to 50 carbon atoms, unsubstituted or substituted by O, S, F, Cl, Br, I, in each case identical or different, and/or polystyrene, polyvinyl acetate, polyacrylate, polymethacrylate, and polyacrylonitrile radicals having 5–5,000 repeating units.

Z'=H, OH, Cl, Br, amino, amineoxy, alkenyloxy, aryloxy or phosphate radicals, it being possible for the organic radicals to carry up to 20 carbon atoms, in each case identical or different.

t=3 or 4.

All amounts by weight are based on the total amount of silicone formulations.

Examples of silanes of the formula indicated above are methyltriacetoxysilane, ethyltriacetoxysilane, isopropyltriacetoxysilane, isopropoxytriacetoxysilane, vinyltriacetoxysilane, methyltrisdiethylaminooxysilane, methyltris(cyclohexylamino)silane, methyltris(diethylphosphato)silane, and methyltris(methyl ethyl ketoximo)silane.

A further possibility is for the silicone rubber formulations of the invention to contain, in addition to the organopolysiloxane and the crosslinker, from 0.5 to 99.5% by weight, preferably from 2.0 to 30.0% by weight, of an unfunctionalized polysiloxane.

The polysiloxanes used here may have a viscosity of up to 500,000 cP (500 Pa·s). Suitable for HTV silicone rubbers of the invention are, for example, Baysilone MS 10 (viscosity 10–20 mPa·s) or the distributor oil Si 200 (viscosity approximately 28 mPa·s) both available from GE Bayer silicones. For RTV-2C silicone rubbers it is possible, for example, to use the oil M 100 (viscosity approximately 100 mPa·s) from the same manufacturer.

The cited combination of physicochemical data of the hydrophobic precipitated silica results in an excellent reinforcing filler. The markedly reduced (relative to the known precipitated silicas) equilibrium moisture content brings advantages in processing, in the case of unpressurized vulcanization, for example, where the resulting vulcanizates are pore-free in comparison with the use of the known, hydrated precipitated silicas. The optimally adjusted pH and the low DBP number lead to perceptibly reduced roller-softening times. The low electrolyte content in combination with the low moisture content leads, finally, to good electrical properties in the vulcanizates. In cold-curing silicone rubber sealing compounds, the low water content of the hydrophobic precipitated silica used gives advantages for the storage properties of the uncured compositions. The reduced water content also leads to better long-term chemical load-bearing capacities in the vulcanizates.

Besides organopolysiloxanes, hydrophobicized silica, crosslinking agents and crosslinking catalysts, formulations of the invention may of course where appropriate include fillers which are conventionally, often or usually used in compositions that can be cured to elastomers. Examples of such substances are fillers having a surface area of less than 50 $m^2/g$, such as quartz flour, kaolin, phyllosilicates, clay minerals, diatomaceous earth, and also zirconium silicate and calcium carbonate, and also untreated pyrogenic silica, organic resins, such as polyvinyl chloride powders, organopolysiloxane resins, fibrous fillers, such as asbestos, glass fibers and organic pigments, soluble dyes, fragrances, corrosion inhibitors, agents which stabilize the compositions against the influence of water, such as acetic anhydride, agents which retard curing, such as benzotriazole, and plasticizers, and also trimethylsiloxy-endblocked dimethylpolysiloxanes.

The silicone rubber formulations may further additionally contain from 0.01 to 6% by weight of organic or inorganic compounds of the metals Pt, Sn, Ti and/or Zn as catalyst and/or from 0.01 to 6% by weight of inhibitors and/or 0.01–6% by weight of fungicides or bactericides and/or from 0.01 to 6% by weight of adhesion promoters.

EXAMPLES

Having generally described this invention, a further understanding can be obtained by reference to certain specific examples which are provided herein for purposes of illustration only and are not intended to be limiting unless otherwise specified.

As the silicate starting material, it is preferred to use precipitated silicas which possess a very low silanol group density, i.e., a low alkali consumption/BET surface area ratio, a relatively high CTAB surface area for approximately the same BET surface area, and a high level of whiteness and purity.

Preparation of Base Silica 50.0 $m^3$ of water are charged to a reaction vessel. Slowly, 9.2 $m^3$ of waterglass solution and 0.9 $m^3$ of $H_2SO_4$ are added with stirring to the initial charge, an alkaline pH being maintained in the mixture during the addition. After the end of the addition of waterglass and $H_2SO_4$, the pH of the resulting suspension is within the alkaline range. The suspension is acidified and filtered, and the solid product is washed with deionized water. The hydrophilic base silica can be dried, preferably by an accelerated drying method. The following data relate to the dried precipitated silica thus obtained.

| | |
|---|---|
| BET surface area [$m^2/g$] | 150–170 |
| CTAB surface area [$m^2/g$] | 150–170 |
| Loss on ignition based on the substance dried 2 h/105° C. (DIN 55921) [%] | 3 ± 0.5 |
| pH 5% (methanol/aqueous solution) (DIN 53200) | 6–7 |
| Conductivity (in 5% aqueous dispersion) [$\mu S$] | <100 |
| Tapped density [g/l] | >250 |
| Sears number | <13 |

The contents of DIN 55921 and DIN 53200 incorporated herein by reference.

The base silica and the polysiloxane are mixed until a defined carbon content is obtained; in other words, the mixing ratio is a function of the arithmetic proportion for setting the required carbon content.

1. Measurement Techniques 1.1 Methanol Wettability

Silicas whose surfaces have been modified with nonhydrolyzable organic groups are usually not wetted by water.

These hydrophobic silicas can, however, be wetted by a methanol/water mixture. The fraction of methanol in this mixture—expressed as a percentage by weight—is a measure of the hydrophobicity of modified silica. The higher the methanol fraction, the better the hydrophobicization of the substance.

Procedure:

200 mg of each hydrophobic silica or silicate sample is weighed out into 6 centrifuge tubes each with a capacity of 15 ml, and each of the tubes is filled with 8 ml of a methanol/water mixture of ascending methanol concentration. The methanol concentration of the mixtures is guided by the anticipated methanol wettability. The centrifuge tubes are tightly sealed and then shaken vigorously (10 up-and-down motions). To separate the wetted silica/silicate fractions, the tubes are then centrifuged at 2500 rpm for 5 minutes. The wetted fractions form a sediment whose volume can be read off on the scale on the centrifuge tubes. On a graph, the sediment volumes are plotted against the methanol/water mixture concentration. These individual points produce a curve whose position and steepness characterizes the degree of hydrophobicization of the sample under analysis.

Apparatus:

Precision balance

Centrifuge

Centrifuge tubes, graduated

Dispensettes 1.2 DBP Absorption

The DBP absorption (DBP number), which is a measure of the absorbency of the precipitated silica, is determined as follows:

The dibutyl phthalate number is determined using the Brabender plastograph. The DBP number is a measure of the absorbency of a pulverulent product for liquid. The absorbency is dependent on the moisture content, the particle size, and the initial mass of material analyzed.

Apparatus and Reagents

Brabender plastograph with plotter

Multi-Dosimat E 415 (50 1) from Metrohm

Dibutyl phthalate

Procedure 12.5 g of silica are introduced into the kneader of the Brabender plastograph. With continued mixing (kneader paddle speed 125 rpm), dibutyl phthalate runs into the mixture at a rate of 4 ml/minute. The force required for incorporation is low. Toward the end of the determination, the mixture becomes poorly free-flowing. This fact is documented in an increase in the required force, which is indicated on the scale. When the scale has moved by 300, DBP metering is automatically shut off.

Evaluation

The density of DBP is 1.047 g/ml. The DBP absorption is based on the anhydrous, dried substance. When using precipitated silicas of relatively high moisture content, the value must be corrected using the following table if these silicas are not dried prior to the determination of the DBP number.

Correction table for dibutyl phthalate absorption—anhydrous—

|         | correction figure |    |    |    |    |
|---------|-------------------|----|----|----|----|
| % water | .0                | .2 | .4 | .6 | .8 |
| 0       | 0                 | 2  | 4  | 5  | 7  |
| 1       | 9                 | 10 | 12 | 13 | 15 |
| 2       | 16                | 18 | 19 | 20 | 22 |
| 3       | 23                | 24 | 26 | 27 | 28 |
| 4       | 28                | 29 | 29 | 30 | 31 |
| 5       | 31                | 32 | 32 | 33 | 33 |
| 6       | 34                | 34 | 35 | 35 | 36 |
| 7       | 36                | 37 | 38 | 38 | 39 |
| 8       | 39                | 40 | 40 | 41 | 41 |
| 9       | 42                | 43 | 43 | 44 | 44 |
| 10      | 45                | 45 | 46 | 46 | 47 |

The correction figure corresponding to the water content is added to the experimentally determined DBP value; for example, a water content of 5.8% would mean an add-on of 33 g/100 g for the DBP absorption.

1.3 Particle Size

The particle size is determined using a Malvern Mastersizer in ethanol following ultrasound treatment for 5 minutes. The measurement is made automatically and provides the average particle size $d_{4,3}$ from a volume distribution.

1.4 Determination of the Tristimulus Value $R_y$ in Accordance with DIN 5033 (The Contents of Which are Incorporated Herein by Reference)

Application

Using the Datacolor 3890 spectrophotometer, the tristimulus value $R_y$ is determined for silicas, silicates, and zeolites (powder suspension).

Analytical Procedure

The silica to be analyzed is first ground to an average particle diameter of about 8 to 15 µm and then pressed to a tablet using a powder press. The amount required depends on the fineness of the powder. The amount of powder introduced is such that the thread of the press closure reaches its last turn.

The samples are placed under the meter, and whiteness measurements $R_y$ and $R_{460}$ are selected from the menu of the control computer. After the sample designation has been entered, the space key is operated in order to start the measurement.

Following entry of the memory code, the measurements are printed out.

The values are calculated automatically in accordance with the following formula:

$$y = \sum_{400}^{700} S*(\lambda) * Y(\lambda) * R(\lambda)$$

where $Y(\lambda)$ is the standard distribution coefficient, $S(\lambda)$ is the relative spectral radiation distribution of the illumination source, and $R(\lambda)$ is the spectral reflectance of the sample.

1.5 Determination of the Sears number of Silicas, Silicates and Hydrophobic Silicas 1. Application Free OH groups are detectable by titration with 0.1 N KOH in the range from pH 6 to pH 9.

2. Apparatus 2.1 Precision balance accurate to 0.01 g 2.2 Memotitrator DL 70, Mettler, equipped with 10 ml and 20 ml burette, 1 pH electrode and 1 pump (e.g., NOUVAG pump, type SP 40/6)

2.3 Printer 2.4 Titration vessel 250 ml, Mettler 2.5 Ultra-Turrax 8,000–24,000 rpm 2.6 Thermostated waterbath 2.7 2 dispensers 10–100 ml for metering methanol and deionized water 2.8 1 dispenser 10–50 ml for metering deionized water 2.9 1 measuring cylinder 100 ml 2.10 IKA universal mill M 20

3. Reagents 3.1 Methanol p.A.

3.2 Sodium chloride solution (250 g NaCl p.A. in 1,000 ml deionized water)

3.3 0.1 N hydrochloric acid 3.4 0.1 N potassium hydroxide solution 3.5 Deionized water 3.6 Buffer solutions pH 7 and pH 9

4. Procedure 4.1 Sample preparation

Grind about 10 g of sample for 60 seconds in the IKA universal mill M 20.

Important: Since only very finely ground samples give reproducible results, these conditions must be strictly observed.

4.2 Analytical procedure 4.2.1 Weigh out 2.50 g of the sample prepared in accordance with section 4.1 into a 250 ml titration vessel.

4.2.2 Add 60 ml of methanol p.A.

4.2.3 After complete wetting of the sample, add 40 ml of deionized water.

4.2.4 Disperse for 30 seconds using the Ultra-Turrax at a speed of about 18,000 rpm.

4.2.5 Rinse particles of sample adhering to the vessel edge and stirrer into the suspension using 100 ml of deionized water.

4.2.6 Condition sample to 25° C. in a thermostated waterbath (for at least 20 minutes).

4.2.7 Calibrate pH electrode with the buffer solutions pH 7 and pH 9.

4.2.8 The sample is titrated in the Memotitrator DL 70 in accordance with method S 911. If the course of titration is indistinct, a duplicate determination is carried out subsequently.

The results printed out are as follows:

pH $V_1$ in ml/5 g $V_2$ in ml/5 g

5. Calculation $$V_1 = \frac{V*5}{E}$$

$$V_2 = \frac{V*5}{E}$$

$V_1$=ml KOH or ml HCl to pH 6/5 g of substance $V_2$=ml KOH consumed to pH 9/5 g of substance E=initial mass Principle First of all the initial pH of the suspension is measured, then according to the result the pH is adjusted to 6 using KOH or HCl. Then 20 ml of NaCl solution are metered in. The titration is then continued to a pH of 9 using 0.1 N KOH.

Sears numbers

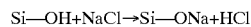

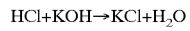

1.6 Determination of the tapped density in accordance with DIN/ISO 787/11, the contents of which are incorporated herein by reference Procedure 10 g of the sample under analysis are weighed accurately to 0.01 g on the precision balance, and are introduced into the graduated 250 ml glass cylinder of the jolting volumeter. After 1,250 jolts, the volume of the tapped material is read off.

Calculation

Tapped density:

$$g/l = \frac{E \cdot 1000}{I}$$

The tapped volume corresponds to the value read off.

E=initial mass in g

I=volume in ml

Apparatus

| | |
|---|---|
| Precision balance | Engelsmann, Ludwigshafen |
| Jolting volumeter | |
| 250 ml glass cylinder, graduated | Engelsmann, Ludwigshafen |

Remarks

In special cases, the material may be passed through a 500 μm sieve before weighing, or the initial mass may be increased. This must be specified in a test report.

1.7 Determination of CTAB Surface Area

1. Application

The method is based on the adsorption of CTAB (N-cetyl-N,N,N-trimethylammonium bromide) on the "external" surface, which is also referred to as the "rubber-active surface".

The adsorption of CTAB takes place in aqueous solution with stirring and ultrasound treatment. Excess, unadsorbed CTAB is determined by back-titration with SDSS (dioctylsodium sulfosuccinate solution) using a titroprocessor, the endpoint being given by the maximum clouding of the solution and determined using a phototrode.

For the calculation, an occupancy of 0.35 nm² per CTAB molecule is assumed.

The determination is made in accordance with ASTM 3765, the contents of which are incorporated herein by reference.

With each measurement series, a standard sample of type VN 3 silica should be tested as well.

2. Reaction Equation: (Back-Titration)

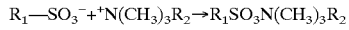

SDSS CTAB

3. Apparatus 3.1 Mill, e.g. IKA, type: M 20

3.2 Analytical balance 3.3 Magnetic stirrer 3.4 Magnetic stirrer rod 3.5 Titroprocessor, e.g., METTLER, type DL 55 or DL 70, equipped with:
pH electrode, e.g., Mettler, type DG 111
phototrode, e.g. Mettler, type DP 550, and
burette, 20 ml volume, for SDSS solution,
burette, 10 ml volume, for 0.1 N KOH 3.6 titration beakers, 100 ml, made of polypropylene 3.7 glass titration vessel, 150 ml volume, closable with snap-on lid 3.8 conical flasks, 100 ml volume, closable with screw lid or NS stopper 3.9 ultrasound bath 3.10 pressure filtration device 3.11 membrane filter of cellulose nitrate, pore sizes of 0.1 μm, 47 mm Ø, e.g., Sartorius type 113 58

3.12 pipettes, 5 ml, 100 ml

4. Reagents 4.1 Potassium hydroxide solution, 0.1 N 4.2 CTAB solution, 0.0151 mol/l 5.50 g of CTAB are dissolved with stirring (magnetic stirrer) in about 800 ml of warm (about 30 –40° C.) demineralized water in a glass beaker, transferred to a 1 l graduated flask, made up to the mark with demineralized water after cooling to 23–25° C., and transferred to a stock bottle.

Note

The solution must be stored and the measurement conducted at ≧23° C., since CTAB crystallizes out below this temperature. The solution should be prepared 10–14 days prior to use.

4.3 SDSS solution 0.00426 mol/l 1.895 g of SDSS (dioctylsodium sulfosuccinate) in a glass beaker are admixed with about 800 ml of demineralized water until the mixture is stirred with a magnetic stirrer until all of the material has dissolved. The solution is then transferred to a 1 l graduated flask, made up to the mark with demineralized water, and transferred to a stock bottle.

SDSS solution readily undergoes biodegradation. The solution prepared should therefore be sealed well and should not be stored for more than 3 months.

The concentration of the CTAB solution is assumed to be exact: 0.0151 mol/l.

The concentration of the SDSS solution should be determined daily by means of a "blank" titration.

5. Procedure 5.1 Blank titration (to determine the concentration of the SDSS solution).

5.2 The consumption of SDSS solution for 5 ml of CTAB solution should be checked (blank value) 1×per day before each series of measurements.

5.1.2 Pipette precisely 5 ml of CTAB solution into titration beakers.

5.1.3 Add about 50 ml of demineralized water.

5.1.4 Titrate with the titroprocessor until the end of titration.

Each blank titration should be performed as a duplicate determination; in the case where values do not agree, further titrations should be carried out until the results are reproducible.

5.2 Adsorption 5.2.1 The granulated and coarse samples are ground in a mill (the beater blade of the mill must be covered).

5.2.2 Weigh out exactly 500 mg of the ground sample on the analytical balance to a precision of 0.1 mg.

5.2.3 Transfer the sample amount weighed out quantitatively to a 150 ml titration vessel with magnetic stirrer rod.

5.2.4 Add exactly 100 ml of CTAB solution, seal titration vessel with lid, and stir on a magnetic stirrer for 15 minutes.

5.2.5 Screw the titration vessel onto the titroprocessor and adjust the pH of the suspension to ±0.05 using KOH, 0.1 mol/l.

5.2.6 4-minute treatment of the suspension in the ultrasound bath.

5.2.7 Filtration through a pressure filter fitted with a membrane filter.

During adsorption, it must be ensured that the temperature is held within the range from 23° C. to 25° C.

5.3 Titration 5.3.1 Pipette 5 ml of filtrate (see section 5.2.7) into 100 ml titration beakers and make up to about 50 ml with demineralized water.

5.3.2 Screw titration beakers onto the titrator.

5.3.3 Carry out titration with SDSS solution in accordance with the defined measurement method, until clouding reaches a maximum.

Each titration should be performed as a duplicate determination; in the case where values do not agree, further titration should be carried out until the results are reproducible.

6. Calculation $$m^2/g = (V_1 - V_2) * \frac{100 * E * 2 * 578.435}{V_1 * 1000}$$

$$m^2/g = (V_1 + V_2) * \frac{115.687 * E}{V_1}$$

-continued $$M^2/g = (V_1 + V_2) * \frac{115.687}{V_1} * 5.5$$

$V_1$=blank sample (ml of SDSS when using 5 ml of CTAB)
$V_2$=consumption (ml of SDSS when using 5 ml of filtrate)
E=initial mass g CTAB/l (5.5 g)
578.435=occupancy of 1 g of CTAB in $m^2$.

The measured value is normally to be given corrected to the anhydrous substance:

$$m^2/g = \frac{CTAB \, m^2/g * 100}{100 - \% \, H_2O}$$

Where the measured value for the standard sample differs by more than ±3 $m^2/g$ from the theoretical value, the entire measurement series must be repeated.

7. Notes re 1. In the literature, SDSS (dioctylsodium sulfosuccinate) is also called Aerosol OT.

On samples with a pH>9, such as Extrusil, the pH is measured but not corrected, since the acid may alter the surface.

Prior to beginning the titration, the phototrode is set to 1,000 mV, corresponding to a transparency of 100%.

re 3. For measuring the different prescribed volumes of the CTAB solution, it is also possible to use dispensers or piston-stroke pipettes, provided they are regularly calibrated.

re 4. The solutions indicated in sections 4.1 and 4.3 can also be purchased as ready-to-use solutions. The present supplier is Kraft, Duisburg.

Telephone: 0203-58-3025.

Order No. 6056.4 CTAb solution 0.0151 ml/l
Order No. 6057.4 SDSS solution 0.00423 mol/l (in 2.5-liter glass bottles)

re 5.2.4 Hydrophobic samples which are not wetted after stirring are dispersed carefully using an ULTRA-TURRAX before the pH is adjusted, in order to wet them.

re 5.2.5 For adjusting the pH it is advisable to use a titrator. The titration is carried out in accordance with the endpoint method.

re 5.2.7 For filtration, nitrogen from a compressed gas bottle is used; an admission pressure of 4–6 bar is to be set.

re 6. Should it be necessary to repeat a measurement series, it should be noted in particular that the pH meter used to set the pH must also be recalibrated.

1.8 Determination of water vapor absorption (water vapor isotherms)

To determine the water vapor absorption, the sample is exposed to different relative humidities at constant temperature (30° C.). The establishment of a constant weight is awaited.

To start with, completely dry air (i.e., air humidity approximately zero) is used. After the equilibrium weight has been reached, this weight is chosen as the reference point; in other words, the water vapor absorption at a higher air humidity is expressed as the difference between the sample weight in completely dry air (following establishment of equilibrium) and the sample weight in humid air (following establishment of equilibrium). The air humidity is varied in steps of 10%.

In order to rule out hysteresis effects, both the water adsorption and the water vapor desorption are measured.

Example 1

The drying and coating of the base silica with silicone oil (DOW CORNING (R) 200 FLUID 50 CS, carbon content approximately 33%, viscosity of 50 mPas) are carried out using a spin-flash drier. The silica is then conditioned at room temperature for at least 48 hours until it has a methanol wettability of at least 20%. The analytical data of the conditioned silica are given in table 1.1.

TABLE 1.1

Analytical data of the conditioned silica

| | | |
|---|---|---|
| Water | % | 5.2 |
| PH | | 6.1 |
| Conductivity | µS | 41 |
| $N_2$ surface area | $m^2/g$ | 84 |
| CTAB surface area | $m^2/g$ | 132 |
| Tapped density | g/L | 317 |
| Reflectance | % | 95.9 |
| C content | % | 4.12 |
| Methanol wettability | % | >20 |

Heat treatment is then carried out at different oxygen contents in a fluidized bed. The experimental parameters are given in table 1.2.

TABLE 1.2

Heat treatment in a fluidized bed at varying oxygen content:

| | Exp. 1 | Exp. 2 | Exp. 3 |
|---|---|---|---|
| Heat treatment time [min] | 60 | 60 | 60 |
| Product temperature [° C.] | 320–380 | 320–380 | 320–380 |
| Oxygen content [%] | 0–0.001 | 4.0–6.0 | 20–22 |
| C content prior to heat treatment | 4.12 | 4.12 | 4.12 |

The experiments show the connection between oxygen content and discoloration. Only in the case of experiments 2 and 3 is a reflectance >94% achieved. In contrast to the silica from experiment 1, these silicas show no visible discoloration in the silicone rubber. The analytical data of the oxidatively heat-treated precipitated silica are given in table 1.3.

TABLE 1.3

Analysis:

| | Exp. 1 | Exp. 2 | Exp. 3 |
|---|---|---|---|
| MeOH wettability | 63 | 63 | 63 |
| C content after heat treatment | 3.96 | 3.47 | 3.39 |
| Reflectance | 92.8 | 94.5 | 94.9 |

Example 2

The base silica is coated with silicone oil (dimethylpolysiloxane, 50 mPas, e.g., DOW CORNING (R) 200 FLUID 50 CS, carbon content approximately 33%) in a Gericke mixer in a mass ratio of 1:1. The resulting powder is conditioned for an hour at a temperature of 105° C. This produces a material in which, although it is wettable by water, the silica and silicone oil can no longer be separated from one another in water. Mixing of this masterbatch with filtercakes of the base silica produces stable formulations in which the silicone oil no longer separates from the hydrophilic filtercake. A hydrophobic masterbatch thus prepared and filtercakes are conveyed together into the spin-flash drier, in which they are mixed and dried. The dimethylsiloxane-treated silica is conditioned by aging at room temperature for 3 days until it has attained a methanol wettability of at least 20%. The analytical data of the conditioned silica are given in table 2.1.

TABLE 2.1

Analytical data of the conditioned silica

| | | |
|---|---|---|
| Water | % | 3.4 |
| pH | | 6.3 |
| Conductivity | µS | 100 |
| $N_2$ surface area | $m^2/g$ | 74 |
| CTAB surface area | $m^2/g$ | 119 |
| DBP absorption | g/100 g | 198 |
| Tapped density | g/L | 323 |
| Reflectance | % | 95.9 |
| C content | % | 5.03 |
| Methanol wettability | % | >20 |

The conditioned precipitated silica is heat-treated under oxidizing conditions in a muffle furnace with a bed height of about 1 to 2 cm at a temperature above 330–360° C. for 1 h. The analytical data of the oxidatively heat-treated precipitated silica are given in table 2.3:

TABLE 2.3

Product data, oxidatively heat-treated material

| | | |
|---|---|---|
| $N_2$ surface area | $m^2/g$ | 96 |
| CTAB surface area | $m^2/g$ | 41 |
| Reflectance | % | 94.5 |
| C content | % | 3.93 |
| Methanol wettability | Approx. % | 67 |

Example 3

The initial distribution of silicone oil (viscosity of 50 mPas, methyl-terminated, e.g., DOW CORNING (R) 200 FLUID 50 CS, carbon content approximately 33%) on the silica (in the form of filtercakes) takes place in a spin-flash drier, with simultaneous drying. The dimethylsiloxane-treated silica is conditioned at room temperature for at least 48 hours until it has attained a methanol wettability of at least 20%. The analytical data of the conditioned silica are given in table 3.1.

TABLE 3.1

Analytical data of the conditioned silica

| | | |
|---|---|---|
| Water | % | 5.2 |
| pH | | 6.1 |
| Conductivity | µS | 41 |
| $N_2$ surface area | $m^2/g$ | 84 |
| CTAB surface area | $m^2/g$ | 132 |
| Tapped density | g/L | 317 |
| Reflectance | % | 95.9 |
| C content | % | 4.12 |
| Methanol wettability | % | >20 |

The material is heat-treated under oxidizing conditions in a muffle furnace with a bed height of about 1 to 2 cm at a temperature above 330–360° C. for 1 h. The analytical data of the oxidatively heat-treated precipitated silica are given in table 3.2.

TABLE 3.2

| Product data, oxidatively heat-treated material | | |
|---|---|---|
| N₂ surface area | m²/g | 102 |
| Reflectance | % | 94.7 |
| C content | % | 3.59 |
| Methanol wettability | approx. % | 67 |

Example 4

The base silica is coated in a mass ratio of 1:1 with silicone oil (dimethylpolysiloxane, 50 mPas, e.g., DOW CORNING (R) 200 FLUID 50 CS carbon content approximately 33%) in a Gericke mixer. The resulting powder is conditioned for at least one hour at a temperature of 105° C. This produces a material in which, although it is wettable by water, the silica and silicone oil can no longer be separated from one another with water. Mixing of this masterbatch in water produces stable suspensions in which the silicone oil can no longer be separated from the silica. The analytical data of the suspension are given in table 4.1.

TABLE 4.1

| Suspension data | | |
|---|---|---|
| Solids content | % | 12.8 |
| pH | | 5.2 |
| Conductivity | μS | 382 |
| Viscosity | mPas | 183 |

The suspension is dried using a spray drier. The dimethylsiloxane-treated silica is conditioned by aging at room temperature for at least 48 hours until it has attained a methanol wettability of at least 20%. The analytical data of the conditioned silica are given in table 4.2.

TABLE 4.2

| Analytical data of the conditioned silica | | |
|---|---|---|
| Loss on ignition | % | 12.4 |
| Water | % | 2.2 |
| pH | | 6.4 |
| Conductivity | μS | 135 |
| N₂ surface area | m²/g | 80 |
| CTAB surface area | m²/g | 131 |
| DBP absorption | g/100 g | 236 |
| Tapped density | g/L | 256 |
| Reflectance | % | 94.5 |
| C content | % | 4.21 |
| Methanol wettability | % | >20% |

The conditioned precipitated silica is heat-treated under oxidizing conditions in a muffle furnace with a bed height of about 1 to 2 cm at a temperature above 330–360° C. for 1 h. The analytical data of the oxidatively heat-treated precipitated silica are given in table 4.3.

TABLE 4.3

| Product data, oxidatively heat-treated | | |
|---|---|---|
| Water | % | 0.6 |
| N₂ surface area | m²/g | 91 |
| CTAB surface area | m²/g | 52 |
| Reflectance | % | 94.3 |
| C content | % | 4.01 |
| Methanol wettability | approx. % | 66 |

Example 5

Silicone oil (polydimethylsiloxane, 50 mPas, e.g., DOW CORNING (R) 200 FLUID 50 CS, carbon content approximately 33%) is suspended in a suspension of the base silica (solids content 12.8%) using a high-shear mixer. The distribution of the silicone oil in the silica suspension is conserved by immediate spray drying. The dimethylsiloxane-treated silica is conditioned by aging at room temperature for at least 48 hours until it has attained a methanol wettability of at least 20%. The analytical data of the conditioned silica are given in table 5.1.

TABLE 5.1

| Analytical data of the conditioned silica | | |
|---|---|---|
| Loss on ignition | % | 13.0 |
| Water | % | 2.2 |
| pH | | 5.5 |
| Conductivity | μS | 100 |
| N₂ surface area | m²/g | 85 |
| CTAB surface area | m²/g | 137 |
| DBP absorption | g/100g | 253 |
| Tapped density | g/L | 270 |
| Reflectance | % | 94.2 |
| C content | % | 4.78 |
| Methanol wettability | % | >20% |

The material is heat-treated under oxidizing conditions in a muffle furnace with a bed height of about 1 to 2 cm at a temperature above 330–360° C. for 1 h. The analytical data of the oxidatively heat-treated precipitated silica are given in table 5.2.

TABLE 5.2

| Product data, oxidatively heat treated | | |
|---|---|---|
| Water | % | 1.6 |
| N₂ surface area | m²/g | 102 |
| CTAB surface area | m²/g | 43 |
| Reflectance | % | 94.2 |
| C content | % | 3.44 |
| Methanol wettability | Approx. % | 65 |

Example 6

The hydrophobic base silica was coated dry with silicone oil (polydimethylsiloxane, viscosity 50 mPas, e.g., DOW CORNING (R) 200 FLUID 50 CS, carbon content approximately 33%) and conditioned by aging at room temperature for at least 48 hours until it had attained a methanol wettability of at least 20%. The material is heat treated under oxidizing conditions at a temperature above 330–360° C. for 1 h. The analytical data of the resulting material are given in table 6.1.

TABLE 6.1

Product data, oxidatively heat treated

| | | |
|---|---|---|
| Water | % | 1.1 |
| Loss on ignition | | 4.3 |
| $N_2$ surface area | $m^2/g$ | 89 |
| pH | | 7.9 |
| Conductivity | µS | 40 |
| DBP | % | 189 |
| C content | % | 3.9 |
| Reflectance | % | 95 |
| Methanol wettability | % | 67 |

Example 7

Table 7.1, 7.2 and FIG. 7.3 show the rheological, mechanical, and optical properties of the precipitated silica of example 6 in an LSR, RTV-2C, and HTV silicone rubber mixture.

TABLE 7.1

Rheological behaviour of the RTV-2C system

| | Filling level | Yield point following incorporation [Pa] | Yield point after 7 days [Pa] | Viscosity directly after incorporation [Pa*s] | Viscosity after 7 d [Pa*s] |
|---|---|---|---|---|---|
| Silica from example 6 | 20 | <5 | <5 | 42 | 48 |

TABLE 7.2

Rheological behavior of the LSR system

| | Filling level | Yield point [Pa] | Viscosity [Pa*s] | Visual impression |
|---|---|---|---|---|
| Silica from example 6 | 20 | <23 | <58 | pure-white mixture |

Figure 3:
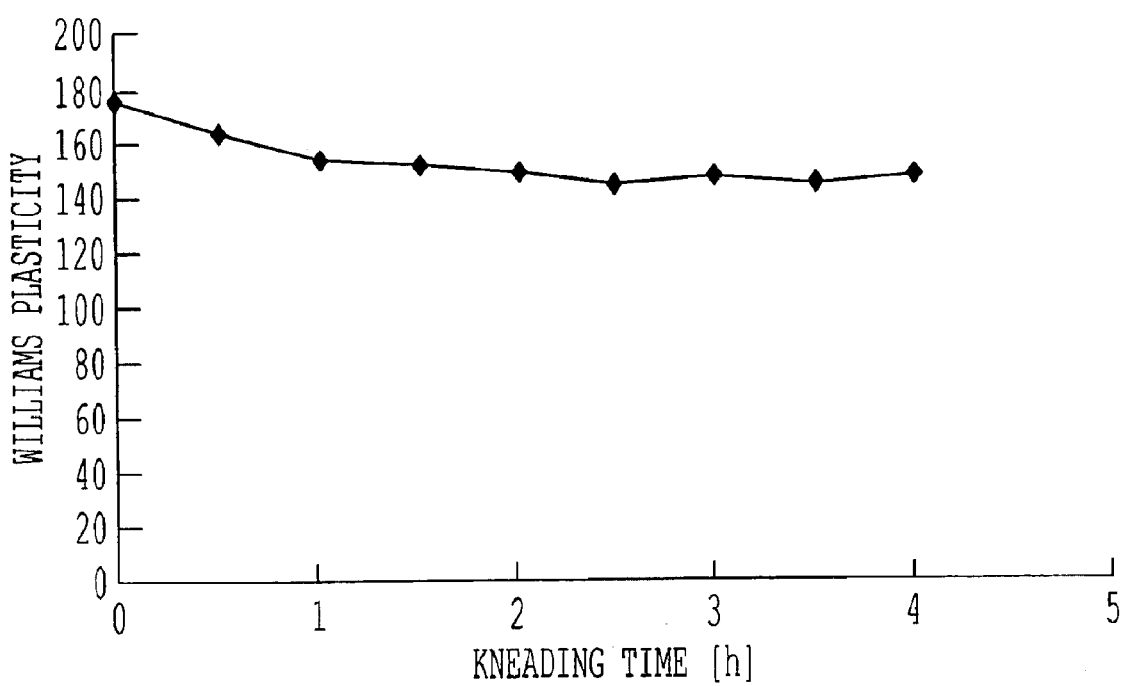
FIG. 3: plot showing the relationship between the kneading time and the Williams plasticity.

FIG. 3 shows the change in viscosity of the HTV silicone rubber system in the course of kneading at a filling level of 40% and without using processing additives.

The silicone rubber mixtures of the invention have low thickening properties and they exhibit virtually no afterstiffening "(grapehardening)". The vulcanizates produced from them do not display any discoloration phenomena.

Table 7.4 shows the incorporation times, which prove to be very short without using processing additives. The lightness in color of the compound is high.

TABLE 7.4

| | Incorporation time 1 [min] | Incorporation time 2 [min] | Incorporation time 3 [min] | Lightness in color of compound |
|---|---|---|---|---|
| Silica from example 6 | 6 | 5 | 6 | 64.1 |

In other words, incorporation is very easy and quick, and produces a compound free from discoloration.

Obviously, numerous modifications and variations of the present invention are possible in light of the above teachings. It is therefore to be understood that within the scope of the appended claims, the invention may be practiced otherwise than as specifically described herein.

This application is based on German Patent Application Serial No. 10146256.5, filed on Sep. 20, 2001 and 10200247.9, filed on Jan. 5, 2002, both incorporated herein by reference.

What is claimed is:

1. A silicone rubber formulation, comprising:
   from 0.5 to 60% by weight of a hydrophobic silica having the following properties:

| | |
|---|---|
| carbon content | >3.1% |
| methanol wettability | >60% |
| reflectance | >94% |
| BET/CTAB ratio | >1 and <3 |
| DBP absorption | <230 g/100 g |
| BET surface area | 50–110 $m^2/g$ |
| CTAB surface area | >30 $m^2/g$ |
| water vapor absorption at 30° C. and 30 AH | <1.3 |
| water vapor absorption at 30° C. and 70 AH | <1.7; and | from 30–99.5% by weight of an organopolysiloxane of the formula $Z_nSiR_{3-n}$—O—$[SiR_2O]_x$—$SiR_{3-n}$—$Z_n$ wherein
   R=alkyl, alkoxy, aryl, hydroxy, hydride, alkenyl radicals, having from 1 to 50 carbon atoms, unsubstituted or substituted by O, S, F, Cl, Br, I, in each case identical or different, and/or polystyrene, polyvinyl acetate, polyacrylate, polymethacrylate, and polyacrylonitrile radicals having 50–10,000 repeating units,
   Z=H, OH, Cl, Br, amino, amineoxy, alkenyloxy, aryloxy or phosphate radicals, it being possible for the organic radicals to carry up to 20 carbon atoms, in each case identical or different,
   n=1–3, and
   x=100–15,000.

2. A silicone rubber formulation as claimed in claim 1, wherein the silicone rubber compounds further comprises from 0.01 to 20% by weight of a crosslinker having the formula:

wherein
   R'=alkyl, alkoxy, aryl, alkenyl radicals, having from 1 to 50 carbon atoms, unsubstituted or substituted by O, S, F, Cl, Br, I, in each case identical or different, and/or polystyrene, polyvinyl acetate, polyacrylate, polymethacrylate, and polyacrylonitrile radicals having 5–5,000 repeating units,
   Z'=H, OH, Cl, Br, amino, amineoxy, alkenyloxy, aryloxy or phosphate radicals, it being possible for the organic radicals to carry up to 20 carbon atoms, in each case identical or different,
   t=3 or 4.

3. A silicone rubber formulation as claimed in claim 1, further comprising from 0.5 to 99.5% by weight of an unfunctionalized polysiloxane.

4. A silicone rubber formulation as claimed claim 1, further comprising from 0.01 to 6% by weight of organic or inorganic compounds of the metals Pt, Sn, Ti and/or Zn as catalyst and/or from 0.01 to 6% by weight of inhibitors and/or 0.01–6% by weight of fungicides or bactericides and/or from 0.01 to 6% by weight of adhesion promoters.

5. A silicone rubber formulation as claimed in claim 1, wherein the organopolysiloxanes have a viscosity of not more than 500,000 cP.

6. A silicone rubber formulation as claimed in claim 1, wherein the hydrophobic silica has a modified Sears number <1.6.

7. A silicone rubber formulation as claimed in claim 1, wherein the hydrophobic silica has a pH of from 5.0 to 9.0.

8. A silicone rubber formulation as claimed in claim 1, wherein the hydrophobic silica has a water content of <2%.

9. A silicone rubber formulation as claimed in claim 1, wherein the hydrophobic silica has a conductivity of <500 µS.

10. A silicone rubber formulation as claimed in claim 1, wherein the hydrophobic silica has a loss on ignition of >3%.

11. A silicone rubber formulation as claimed in claim 1, wherein the hydrophobic silica contains a hydrophobic precipitated silica.

12. A method of making the silicone rubber formulation as claimed in claim 1, comprising combining the hydrophobic silica and the organopolysiloxane.

13. A silicone rubber system comprising the silicone rubber formulation as claimed in claim 1.

14. The silicone rubber system of claim 13, which is selected from the group consisting of high temperature crosslinking silicone rubbers (HTV), liquid silicone rubbers (LSR/LIM), and two-component, room temperature crosslinking silicone rubbers (RTV-2C).

15. A method of preparing the silicone rubber system of claim 13, comprising incorporating the silicone rubber formulation into the system.

16. An article selected from the group consisting of sparkplug leads, other automotive applications, gaskets, sports goods, impression compounds, dental composites, silicone rubber coatings and surface-coating systems, wherein the article contains the silicone rubber formulation of claim 1.

17. A method of preparing the article of claim 16, comprising incorporating the silicone rubber formulation into the article.

* * * * *